United States Patent [19]

Christian et al.

[11] 4,268,832
[45] May 19, 1981

[54] MULTIPATH DISCRIMINATING ANTENNA SYSTEM

[75] Inventors: J. Robert Christian, Oceanport, N.J.; James W. Mink, Raleigh, N.C.

[73] Assignee: The United States of America as represented by the Secretary of the Army, Washington, D.C.

[21] Appl. No.: 148,112

[22] Filed: May 9, 1980

[51] Int. Cl.³ .................... H01Q 13/02; G01S 1/16
[52] U.S. Cl. .......................... 343/786; 343/100 PE
[58] Field of Search ............ 343/705, 786, 797, 853, 343/100 PE

[56] References Cited

U.S. PATENT DOCUMENTS 3,827,051 7/1974 Foldes ................................ 343/854

Primary Examiner—Eli Lieberman
Attorney, Agent, or Firm—Nathan Edelberg; Jeremiah G. Murray; Bernard Franz

[57] ABSTRACT

To reduce guidance errors in a microwave landing system from false signals reflected by objects along runways, the transmitting antenna radiates an elliptically polarized beam. At the airborne receiver an antenna, such as a pyramidal horn, maintains the separation of the horizontal and vertical components. These components are separated and then split on an equal power basis. One part of the vertical field component is shifted by 90 degrees and added to one part of the horizontal component in a detector, whose output is in effect like that of a circularly polarized receiver. The other parts of the horizontal and vertical components are separately detected. The outputs of the three detectors are combined in a multiplier, to yield a resultant output. For a very broad angular distribution the undesired reflected signals are strongly attenuated.

6 Claims, 3 Drawing Figures

MULTIPATH DISCRIMINATING ANTENNA SYSTEM

The invention described herein may be manufactured, used, and licensed by or for the Government for governmental purposes without the payment of any royalties thereon.

BACKGROUND OF THE INVENTION

This invention relates to an antenna and receiver input system for discriminating among signals propagated via multiple paths from a transmitter; and more particularly to such a system for use in a microwave landing system.

Various forms of radar and radio communication have been used in the past with voice and instruments to provide aids to landing of aircraft, particularly when visibility is poor because of fog or other weather conditions. For several years there has been standardization on the Instrument Landing System (ILS). To improve performance and provide truly all weather operation, a Microwave Landing System (MLS) has been proposed. A good illustration of the concept and characteristics of the MLS and a comparison to the ILS is found in *National Geographic* (Vol. 152, No. 2) August 1977 at pages 230 and 231.

Further background information can be found in "Electromagnetic Waves and Radiating Systems" by E. C. Jordan and K. G. Balman, Prentice-Hall, Englewood Cliffs, N. J. 1968, particularly in Chapter 11, Chapter 14, pages 143–148, and pages 345–347; in "The Theory of Linear Antennas" by R. W. P. King, Harvard University Press, Cambridge, Mass., 1956, particularly in Chapter III and at page 309; and in "Reference Data for Radio Engineers", H. P. Westman (Editor), Howard W. Sams, Inc., New York, N. Y. 1972, pages 6-1, 4. All of the above publications are hereby incorporated herein by reference.

Guidance errors can be introduced into microwave landing systems from false signals that are received from energy reflected by objects present along runways. Studies have shown that the use of horizontally polarized radiation, in contrast to vertically polarized radiation, reduces the amplitudes of the false signals because of its lower reflection coefficient for vertical objects at small angles of incidence.

SUMMARY OF THE INVENTION

An object of the invention is to provide a system which reduces errors due to reflected energy.

A feature of the invention relates to the design of an antenna system which combines the attributes of both circular and horizontal polarization. This concept requires that the transmitting antenna radiates an elliptically polarized beam. The receiving antenna must be capable of receiving and maintaining separate, two orthogonal components of the electric field. The received signal is split on an equal power basis into the orthogonal components via directional couplers. One part of one of the components is phase shifted by 90 degrees and added to the other component in a detector, whose output is in effect the same as if a circularly polarized antenna were used. The remaining portions of the two components are detected separately. Then the product of the three outputs is formed. The result is that the undesired reflected signals are strongly attenuated.

DETAILED DESCRIPTION

The antenna and receiver input system presented herein is useful for multipath discrimination in digital system applications where a pencil beam antenna cannot be used because of system requirements, i.e., the airborne antenna of microwave landing systems.

Guidance errors can be introduced into microwave landing systems from false signals that are received from energy reflected by objects present along runways. Studies have shown that the use of horizontally-polarized radiation, in contrast to vertically polarized radiation, reduces the amplitudes of the false signals because of its lower reflection coefficient for vertical objects at small angles of incidence. A study also indicates that circular polarization may be better than horizontal polarization for large angles of incidence, but that horizontal is still the best for the smaller angles. However, an antenna system that combines the attributes of both circular and horizontal polarization will be described below.

Figure 1:
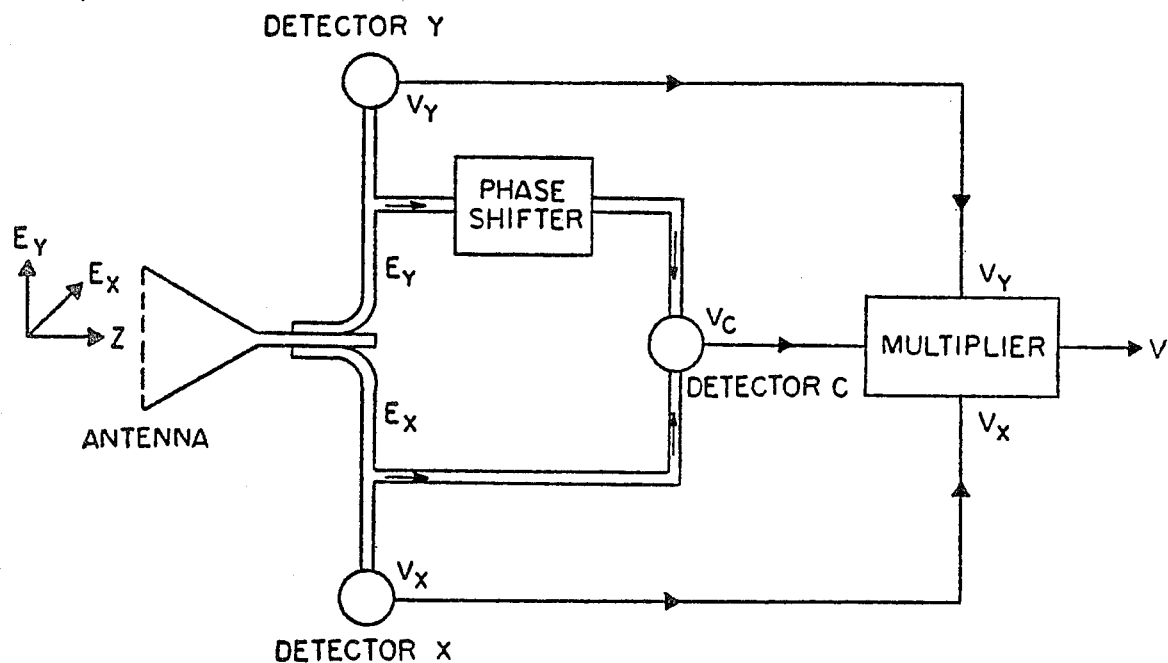
FIG. 1 is a symbolic block diagram of an antenna and receiver input system according to the invention.
Figure 2:
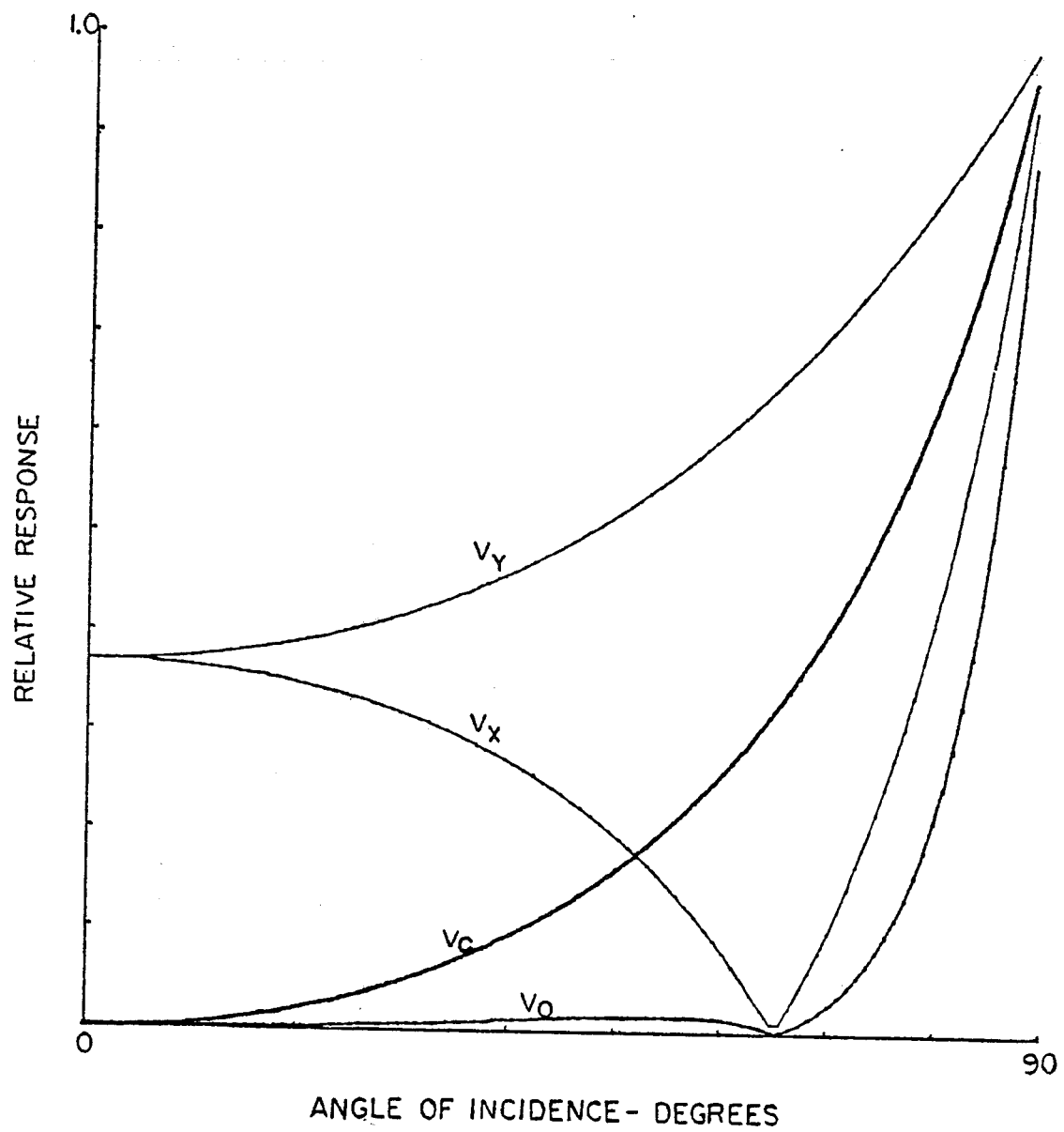
FIG. 2 shows graphs of performance.

This concept requires that the transmitting antenna radiates an elliptically polarized beam. The receiving antenna must be capable of receiving and maintaining separate, two orthogonal components of the electric field. For discussion purposes one is designated the x-polarized filed and the other the y-polarized field. The receiving antenna could be two orthogonal dipoles, a square pyramidal horn or any other type of antenna that can maintain the field separation. Here, the use of a pyramidal horn feeding a square waveguide will be assumed. In the waveguide the x-polarized field and the y-polarized field can be separated and then each split on an equal power basis via directional couplers. Now assume that one part of the y-polarized field is phase shifted by 90 degrees and added to part of the x-polarized field in detector C, see FIG. 1. The output of detector C, $V_c$, is in effect the same as if a circularly polarized antenna were used. The remaining portions of the x and y fields are detected separately in detectors X and Y, respectively. Detector X yields an output sensitive to only the horizontal polarized field while detector Y is sensitive only to the vertical polarized field. As an example of the relative response of detectors C, X and Y, i.e., $V_c$, $V_x$, $V_y$, for a circularly polarized wave which has been reflected from a typical building material (concrete) is shown in FIG. 2. Their response as a function of incident angle is shown. Now if the product of these outputs is formed, $V_o = V_c V_x V_y$, the resultant output is the curve $V_o$ in FIG. 2. Examination of this curve shows that for a very broad angular distribution the undesired reflected signals are strongly attenuated. The theoretical treatment of this concept will be given below.

THEORY

Figure 3:
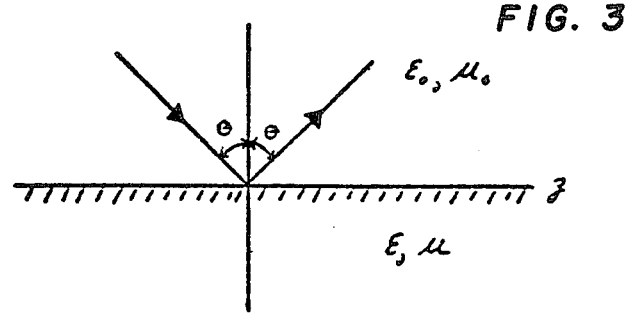
FIG. 3 is a coordinate system diagram.

The coordinate system shown in the diagram of FIG. 3 will be used. The x coordinate is upward from the plane of the paper. The xz plane is horizontal. An elliptically polarized incident wave may be expressed, before reflection from any interface, as follows:

$$E_x = -i\alpha E_o \quad ZH_x = -E_o \quad (1)$$
$$E_y = E_o \sin\theta \quad ZH_y = -i\alpha E_o \sin\theta$$
$$E_z = E_o \cos\theta \quad ZH_z = -i\alpha E_o \cos\theta$$

where $$Z = \sqrt{\frac{\mu}{\epsilon}}$$

and $\beta$ determines the ellipticity of the incident wave. E is the electric field vector, H is the magnetic field vector, $\beta$ is the magnetic permeability, and $\epsilon$ is the dielectric constant. To normalize the field for constant power density as a function of the parameter $\alpha$, let $$E_o = \sqrt{\frac{2PZ}{1+\alpha\alpha^*}}$$

where P is the power density. The outgoing wave, after reflection from the interface is:

$$E_x = -iR_\perp \alpha E_o \quad ZH_x = -R_\| E_o \quad (2)$$
$$E_y = R_\| E_o \sin\theta \quad ZH_y = -iR_\perp \alpha E_o \sin\theta$$
$$E_z = R_\| E_o \cos\theta \quad ZH_z = iR_\perp \alpha E_o \cos\theta$$

where $R_\perp$ and $R_\|$ are the appropriate Fresnel reflection coefficients. (See Jordan and Balman, pp. 143–148). The following substitution can be made to express the wave as two counter rotating circularly polarized waves.

$$R_\| = \tfrac{1}{2}(R_\| + \alpha R_\perp) + \tfrac{1}{2}(R_\| - \alpha R_\perp) \quad (3)$$
$$\alpha R_\perp = \tfrac{1}{2}(R_\| + \alpha R_\perp) - \tfrac{1}{2}(R_\| - \alpha R_\perp)$$

Therefore: Equation (2) becomes $$E_x = -i[\tfrac{1}{2}(R_\| + \alpha R_\perp) - \tfrac{1}{2}(R_\| - \alpha R_\perp)]\sqrt{\frac{2}{1+\alpha\alpha^*}}\sqrt{PZ} \quad (4)$$

$$E_y = [\tfrac{1}{2}(R_\| + \alpha R_\perp) + \tfrac{1}{2}(R_\| - \alpha R_\perp)]\sqrt{\frac{2}{1+\alpha\alpha^*}}\sqrt{PZ}\sin\theta$$

$$E_z = [\tfrac{1}{2}(R_\| + \alpha R_\perp) + \tfrac{1}{2}(R_\| - \alpha R_\perp)]\sqrt{\frac{3}{1+\alpha\alpha^*}}\sqrt{PZ}\cos\theta$$

At the receiving antenna these reflected fields can again be written in terms of two orthogonal components. The components are then processed in the antenna system according to FIG. 1. The output of detector C, which is the sum of the x-component and the phase shifted y-component is, $$V_c = G_c \left| \tfrac{1}{2}\sqrt{\frac{2}{1+\alpha\alpha^*}}(R_\| + \alpha R_\perp) \right| \quad (5)$$

The output of detectors X and Y are $$V_x = G_x \left| R_\perp \sqrt{\frac{2}{1+\alpha\alpha^*}} \right| \quad (6)$$

and $$V_y = G_y \left| R_\| \sqrt{\frac{2}{1+\alpha\alpha^*}} \right| |\alpha| \quad (7)$$

where $b_c$, $b_x$, $b_y$ are proportionality constants, to account for the antenna, waveguide and detector characteristics. The output $V_o$, the product of $V_c$, $V_x$ and $V_y$ is $$V_o = \tfrac{1}{2} G_c G_x G_y (2/1+\alpha\alpha^*)^{3/2} |1+\alpha| |\alpha| |R_\|| |R_{11}| \quad (8)$$

FIG. 2 is a plot of the above four equations for the special case of reflection from a concrete interface.

The response of this antenna to a direct unreflected beam can be obtained by replacing $R_1 = R_{11} - 1$, or $$V_o = \tfrac{1}{2} G_c G_x G_y (2/1+\alpha\alpha^*) |1+\alpha| |\alpha| \quad (9)$$

and if the direct beam is circularly polarized ($\alpha = 1$) then $$V_o = G_c G_x G_y \quad (10)$$

CONCLUSION

It has been shown that, by the appropriate signal processing of the two orthogonal components of an elliptically polarized beam, the multipath signals caused by energy reflected from obstacles can be greatly reduced over a relatively large angular range. Although only the case of wave reflection from plane interfaces has been calculated, it is reasoned that the response will be similar for periodic surfaces. It should also be mentioned that this antenna concept can be applied, not only to microwave landing systems, but to any multipath environment where large angular coverage is required and circular polarized radiation can be used.

What is claimed is:

1. Apparatus for receiving elliptically polarized electromagnetic energy comprising:
    an antenna means that can maintain separate two orthogonal components of the electric field in the received signal, said components being designated the x-polarized field and the y-polarized field;
    directional coupler means coupled to said antenna means to separate said orthogonal components and to split each of them on an equal power basis into first and second parts;
    phase shifter means to shift said first part of the y-polarized field by 90 degrees, first detector means coupled to add the output of the phase shifter means to said first part of the x-polarized field and to detect the sum field so that the output of the first detector means is in effect the same as if a circularly polarized antenna were used;
    second and third detector means coupled to detect said second parts of the y-polarized and x-polarized fields respectively; and multiplier means coupled to the outputs of the first, second, and third detector means to form the product of the three detected signals to give a resultant output.

2. Apparatus as claimed in claim 1, wherein said antenna means is a pyramidal horn feeding a square waveguide, and the coupling from the directional coupler means to the phase shifter means and to said first, second and third detector means, and also from the phase shifter means to the first detector means, is via square waveguide means.

3. Apparatus as claimed in claim 1 or 2, wherein said x-polarized field is horizontally polarized, and said y-polarized field is vertically polarized.

4. Apparatus as claimed in claim 1 or 2, which is airborne, for use in a microwave landing system.

5. Apparatus as claimed in claim 4, wherein said x-polarized and y-polarized fields are respectively horizontally and vertically polarized.

6. A method of radio signaling to reduce errors due to multipath propagation because of reflections comprising:
- transmitting an elliptically polarized wave;
- receiving the wave with an antenna which maintains separate two orthogonal components designated x-polarized field and y-polarized field;
- separating said two components and splitting each on an equal power basis;
- shifting the phase of one part of the y-polarized component by 90 degrees and adding the result to one part of the x-polarized component in a detector;
- detecting the other parts of the x-polarized and y-polarized components separately;
- and multiplying together the three detected signals to form a resultant output.

* * * * *